United States Patent [19]
Mangiavacchi

[11] Patent Number: 4,768,995
[45] Date of Patent: Sep. 6, 1988

[54] HOOKES UNIVERSAL JOINT

[75] Inventor: Jacques Mangiavacchi, Chatou, France

[73] Assignee: Glaenzer Spicer, Poissy, France

[21] Appl. No.: 39,532

[22] Filed: Apr. 16, 1987

[30] Foreign Application Priority Data

Apr. 28, 1986 [FR] France ................................ 86 06132

[51] Int. Cl.⁴ ................................................. F16D 3/40
[52] U.S. Cl. ....................................... 464/135; 464/130
[58] Field of Search ........................... 403/344, 380, ;
464/128, 130, 132, 134, 135, 136

[56] References Cited

U.S. PATENT DOCUMENTS

| 1,999,487 | 4/1935 | Swenson | 464/130 |
| 2,228,715 | 1/1941 | Wollner | 464/130 |
| 2,255,604 | 9/1941 | Warner | 464/130 |
| 2,341,084 | 2/1944 | Dodge | 464/136 X |
| 2,770,114 | 11/1956 | Slaght | 464/130 |
| 3,216,087 | 11/1965 | Harrington | 464/136 X |
| 3,751,080 | 8/1973 | Bailey et al. | 403/344 |
| 3,783,638 | 1/1974 | Doran et al. | 464/130 |
| 4,334,415 | 6/1982 | Hopkins et al. | 464/134 X |
| 4,637,807 | 1/1987 | Koelling, Sr. | 464/135 |

FOREIGN PATENT DOCUMENTS

| 2165014 | 9/1973 | France . | |
| 2417674 | 9/1979 | France . | |
| 2006923 | 5/1979 | United Kingdom | 464/132 |
| 2125935 | 3/1984 | United Kingdom | 464/134 |

Primary Examiner—Daniel P. Stodola
Attorney, Agent, or Firm—Toren, McGeady & Associates

[57] ABSTRACT

A Hookes universal joint has a yoke (15) which comprises a connecting element (24) and limb elements (28, 29) detachably secured thereto. Each limb element has a bore (31, 110) which receives a respective limb of the joint cross member either with the intermediary of a bearing cup (32) or directly. The limb elements further comprise flanges (34, 123) which face complementary parts of the connecting element, and the flanges and connecting element have inter-engaging splines (38). Bolts (36, 114) hold the limb elements to the connecting element. Lugs (40) on the connecting elements center the cross member in the joint.

6 Claims, 2 Drawing Sheets

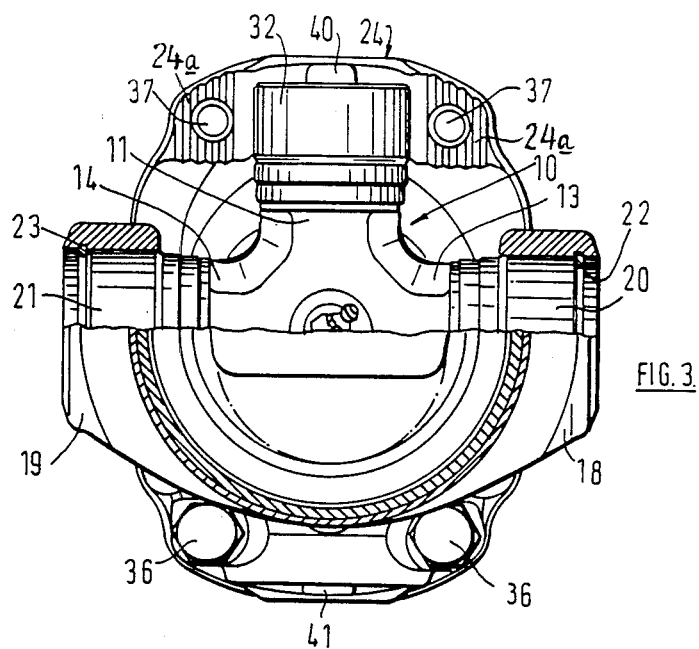
FIG. 3
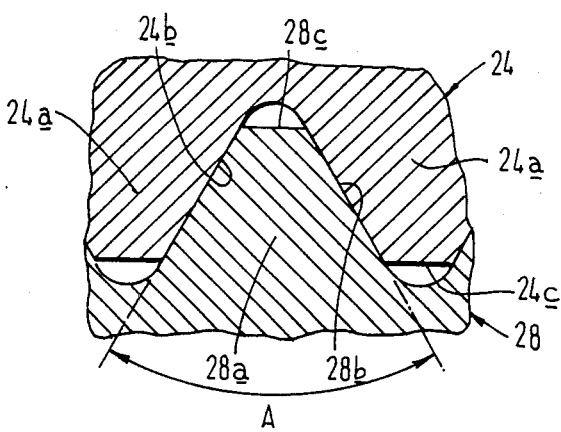
FIG. 4
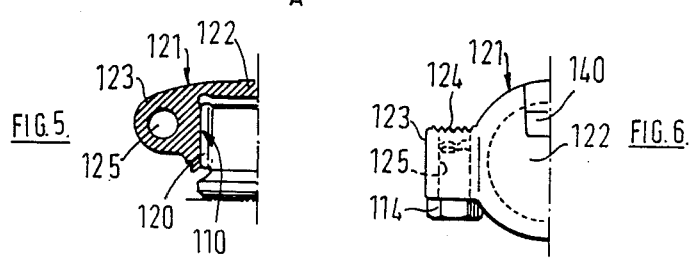
FIG. 5
FIG. 6

HOOKES UNIVERSAL JOINT

This invention relates to a Hookes universal joint, wherein a cross member having two pairs of opposed journals provides for transmission of torque between first and second yokes for connection to respective rotary shaft members, and wherein one of the yokes comprises a connecting element and limb elements which are detachably secured to the connecting element.

Universal joints wherein limb elements are detachable from a connecting element of one of the yokes of the joint are known, e.g. from French Pat. No. 71 44 906 (2165014) or No. 78 04 384. The connecting element and limb elements may have interengaging teeth, or mortise and tenon formations, for effective torque transmission between the connecting element and the cross member held by the limb elements of the yoke. The journals of the cross member may be supported in the limb elements with the intermediary of bearing bushes, or directly.

Such known universal joints have disadvantages, in that the use of the mortise and tenon system for connection of the limb elements and connecting element requires the provision of sufficient clearance for assembly, giving the possibility of bruising and corrosion between interengaging faces, and misalignment.

It is the object of the present invention to overcome or reduce such disadvantages.

According to the invention, we provide a Hookes universal joint comprising a cross member having two pairs of opposed journals, a first yoke for connection to a first shaft member and pivotably supporting one of said pairs of journals, and a second yoke for connection to another shaft member and pivotably supporting the other pair of journals, wherein one of said yokes comprises:

a connecting element for connection to the respective shaft member;

two limb elements each having a bore receiving the respective journal and two flange portions facing complementary parts of the connecting element;

interengaging splines provided on said flange portions and said complementary parts of the connecting element, for torque transmission between said limb elements and connecting element;

fastening means securing said limb elements to said connecting element with said splines in engagement; and means for radially centering the cross member relative to said connecting element.

The splines may extend parallel to the axis of the bore in the respective limb element, and have inclined flanks.

The invention will now be described by way of example with reference to the accompanying drawings, of which:

FIG. 3 is partly a section on the line 3—3 of FIG. 1, with part of the joint removed;

FIG. 4 is a detailed section through part of the joint;

FIG. 5 is a view in axial section of part of a further embodiment of joint according to the invention;

FIG. 6 is a plan view of the part shown in FIG. 5.

Figure 1:
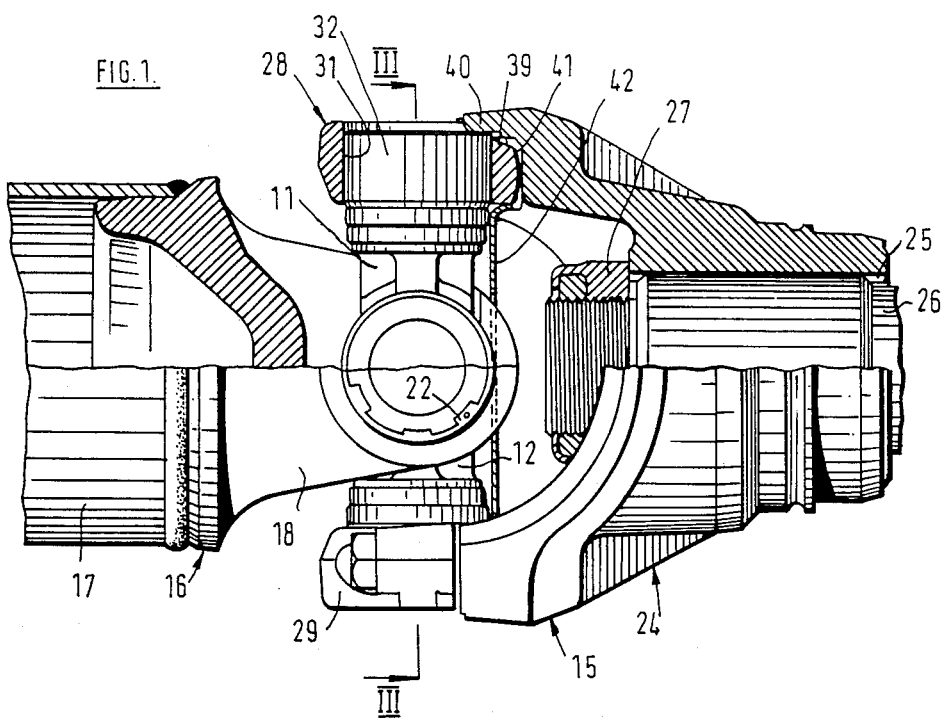
FIG. 1 is an elevation, partly in section, of one embodiment of joint according to the invention.
Figure 2:
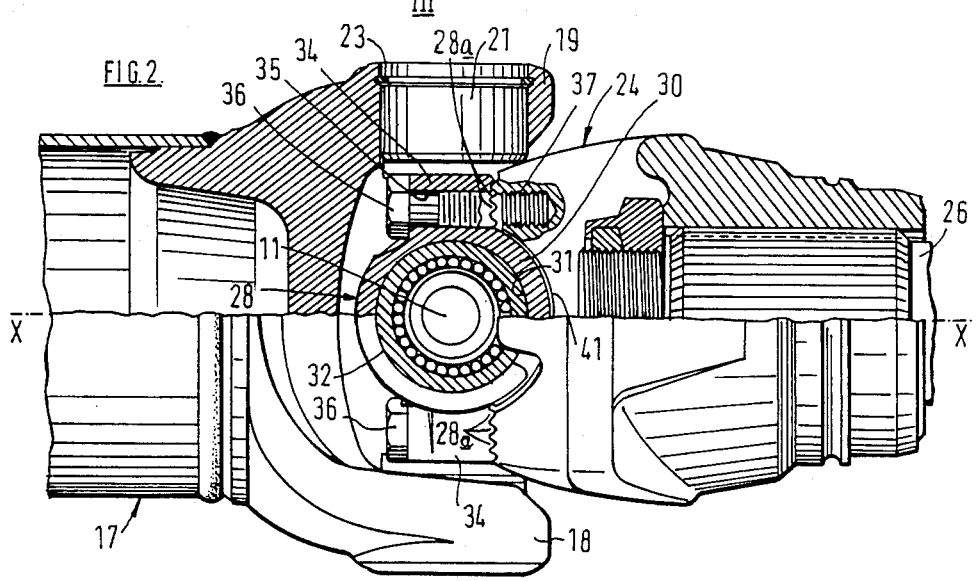
FIG. 2 is a plan, also partly in section, of the joint of FIG. 1.

Referring firstly to FIGS. 1, 2 and 3 of the drawings, there is shown a universal joint comprising a cross member 10 with a first pair of opposed journals 11, 12 and a second pair of opposed journals 13, 14. The journals 11, 12 are pivotably supported in a yoke indicated generally at 15, and the journals 13, 14 by a yoke 16. The yoke 16 is welded to a tubular shaft element 17, and has spaced parallel limbs 18, 19 wherein the journals 13, 14 are supported in bearing cups 20, 21 respectively held in aligned bores in the limbs 18, 19 by circlips 22, 23 respectively.

The yoke 15 comprises firstly a connecting element 24 which has a splined bore 25 receiving a correspondingly splined end portion of a shaft element 26. The shaft element 26 is retained by a nut 27 on a threaded portion of the shaft beyond the splines thereof.

The yoke 15 further comprises two limb elements 28, 29 which receive the journals 11, 12 respectively of the cross member. As most clearly seen with reference to FIG. 2 wherein it is shown partly in section, the limb portion 28 has a generally cylindrical part 30 with a bore 31 wherein is received a bearing cup 32. The bearing cup 32 receives the journal 11 with the intermediary of needle bearing rollers 33, in generally known manner. Flange portions 34 extend on opposite sides of the cylindrical portion 30, and these flange portions have apertures as 35 through which extend bolts 36 generally parallel to the rotational axis (shown as X—X in FIG. 2) of the joint as a whole when in the aligned condition as illustrated. The bolts 36 engage screw-threaded apertures as 37 in the connection portion 24 of the yoke 15, to hold the limb portions to the connecting portion of the yoke.

Where the flange portions as 34 of the limb elements 28, 29 abut the connecting element 24 of the yoke 15, these portions are provided with interengaging splines or teeth 24a, 28a. The splines 24a on the connecting element 24 are clearly seen in FIG. 3, and they extend parallel to the common axis of the limbs 11, 12.

For centralizing the cross member on the rotational axis of the yoke 15, the limb elements 28, 29 have cut-away portions as shown at 39 for limb element 28. This enables the closed end of the bearing cup 32 to be abutted by a lug 40 extending axially from the connecting element 24. A similar lug is provided for abutting the bearing cup in the limb element 29. It will be further noted that there is a clearance as indicated at 41 between a part of each of the cylindrical portion 30 of the limb elements and a recess the connecting element between the projections of the connecting element that carry splines 24a.

The nature of the splines or teeth 28a where each of the flange portions 34 of the limb elements 28, 29 engages the connecting element 24 is shown in detail in FIG. 4. In this Figure, a tooth on the limb element 28 is indicated at 28a, engaging between two adjacent teeth 24a on the corresponding part of the connecting element 24. These teeth have flanks 28b, 24b which are inclined at an angle A, preferably at an angle of 60 degrees. The crests of the teeth 28a, 24a are truncated as at 28c, 24c, and this feature ensures that the splined engagement will be clearance free in case any dirt should enter the splines.

Also shown in FIG. 1 of the drawings is a sheet metal strip 42, welded to the limb elements 28, 29 to hold them on the cross member of the joint prior to the limb elements being bolted to the connecting element of the yoke 15.

In a Hookes universal joint according to the invention, and as in the example above described, effective torque transmission between the cross member of the joint and the shaft connected to the yoke 15 is assured by virtue of the spline engagement between the limb elements and connecting element of the yoke. The limb elements of the yoke are maintained in the correct alignment, and the cross member of the joint is properly centralised. Bolts 36 will be tightened at the appropriate torque.

As apparent from FIG. 2, the splines 28a lie in a plane which extends parallel to and near the axis of bore 31. The lane also extends into the bore.

In an alternative embodiment, illustrated in FIGS. 5 and 6, there is shown part of a limb element 121 for connection to a connecting element of a yoke, which limb element does not receive a separate bearing cup for receiving the respective cross member journal. The limb element has a blind bore 110 with an end wall 122, and needle bearing rollers 120 supporting the cross member journal run directly in the bore 110. The lug (140) on the connecting element of the yoke engages the wall 122. The limb element further comprises radially extending flange portions, one of which is shown at 123, having splines 124 and an aperture 125 for a fixing bolt 114, to engage the connecting element of the yoke.

I claim:

1. A Hookes universal joint comprising a cross member having two pairs of opposed journals, a first yoke for connection to a first shaft member and pivotably supporting one of said pairs of journals, and a second yoke for connection to another shaft member and pivotably supporting the other pair of journals, wherein one of said yokes comprises:

a connecting element for connection to the respective shaft member;

two limb elements each having a cylindrical portion with a bore receiving the respective journal and two flange portions facing complementary parts of the connecting element, said bore having an axis, said flange portions extending radially outwardly from said cylindrical portion;

interengaging splines provided on said flange portions and said complementary parts of said connecting element, for torque transmission between said limb elements and said connecting element, said splines lying in a plane extending parallel to and near said bore axis, said plane extending into said bore, said splines extending parallel to the axis of the bores in the respective limb element, and having inclined flanks;

fastening means securing said limb elements to said connecting element with said splines in engagement; and centering means engaged between said connecting element and the cross member for radially centering the cross member relative to said connecting element.

2. A joint according to claim 1 wherein said connecting element is provided with axially extending lugs cooperating with the limb elements to form said centering means for radially centering the cross member.

3. A joint according to claim 2 wherein said limb elements receive bearing cups supporting the journals in their bores, and said lugs are engageable with said bearing cups.

4. A joint according to claim 2 wherein said limb elements have blind bores wherein said journals are received without separate bearing outer races, and said lugs engage said limb elements.

5. A joint according to claim 1 wherein said fastening means comprises bolts extending through apertures in said flange portions of the limb elements and engaging threaded holes in said connecting element.

6. A joint according to claim 1, wherein said connecting element includes a pair of projections on opposite sides of said cylindrical portion, each carrying one of said complementary parts, said connecting element having a recess between said projections, said cylindrical portion having a circumferential part between said flange portions extending into said recess and being spaced by a clearance from said connecting element.

* * * * *